(12) United States Patent
Roberts et al.

(10) Patent No.: US 11,658,296 B2
(45) Date of Patent: May 23, 2023

(54) USE OF NICKEL IN A LITHIUM RICH CATHODE MATERIAL FOR SUPPRESSING GAS EVOLUTION FROM THE CATHODE MATERIAL DURING A CHARGE CYCLE AND FOR INCREASING THE CHARGE CAPACITY OF THE CATHODE MATERIAL

(71) Applicant: Dyson Technology Limited, Wiltshire (GB)

(72) Inventors: Matthew Robert Roberts, Oxford (GB); Peter George Bruce, Oxford (GB); Niccolo Guerrini, Oxford (GB); Kun Luo, Tianjin (CN); Rong Hao, Shenzhen (CN)

(73) Assignee: Dyson Technology Limited, Malmesbury (GB)

(*) Notice: Subject to any disclaimer, the term of this patent is extended or adjusted under 35 U.S.C. 154(b) by 0 days.

(21) Appl. No.: 16/955,024

(22) PCT Filed: Dec. 18, 2018

(86) PCT No.: PCT/GB2018/053657
§ 371 (c)(1),
(2) Date: Jun. 17, 2020

(87) PCT Pub. No.: WO2019/122845
PCT Pub. Date: Jun. 27, 2019

(65) Prior Publication Data
US 2020/0381718 A1    Dec. 3, 2020

(30) Foreign Application Priority Data

Dec. 18, 2017 (GB) .................................. 17211178

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/525* (2013.01);
(Continued)

(58) Field of Classification Search
CPC ...................................................... H01M 4/505
See application file for complete search history.

(56) References Cited

U.S. PATENT DOCUMENTS 3,761,500 A    9/1973  Thomas
3,993,508 A   11/1976  Erlichman
(Continued)

FOREIGN PATENT DOCUMENTS

CA    2527207 A1   12/2004
CN    1404635 A     3/2003
(Continued)

OTHER PUBLICATIONS

Xu et al. English machine translation of CN103066274A. (Year: 2013).*
(Continued)

*Primary Examiner* — Peter F Godenschwager
(74) *Attorney, Agent, or Firm* — Faegre Drinker Biddle & Reath LLP (57) ABSTRACT

Use of nickel in a cathode material of the general formula Li$(4/3-2x/3-y/3-z/3)$Ni$_x$Co$_y$Al$_z$Mn$(2/3-x/3-2y/3-2z/3)$O$_2$ wherein x is greater than 0.06 and equal to or less than 0.4; y is equal to or greater than 0 and equal to or less than 0.4; and z is equal to or greater than 0 and equal to or less than 0.05 for suppressing gas evolution during a charge cycle and/or increasing the charge capacity of the material.

9 Claims, 8 Drawing Sheets

(51) Int. Cl.
  *H01M 4/525* (2010.01)
  *H01M 10/0525* (2010.01)
  *H01M 4/02* (2006.01)

(52) U.S. Cl.
  CPC ..... *H01M 10/0525* (2013.01); *C01P 2002/52* (2013.01); *C01P 2002/72* (2013.01); *C01P 2002/74* (2013.01); *C01P 2002/77* (2013.01); *C01P 2006/40* (2013.01); *H01M 2004/028* (2013.01)

(56) References Cited

U.S. PATENT DOCUMENTS

| | | |
|---|---|---|
| 4,047,289 A | 9/1977 | Wolff |
| 4,288,381 A | 9/1981 | Dozzi et al. |
| 4,299,986 A | 11/1981 | Cucinella |
| 5,136,046 A | 8/1992 | Park et al. |
| 5,250,784 A | 10/1993 | Muller et al. |
| 5,411,592 A | 5/1995 | Ovshinsky et al. |
| 5,670,652 A | 9/1997 | Drauz et al. |
| 5,718,989 A | 2/1998 | Aoki et al. |
| 6,616,714 B1 | 9/2003 | Gauthier et al. |
| 7,754,384 B2 | 7/2010 | Patoux et al. |
| 8,122,250 B2 | 2/2012 | Haverinen |
| 8,153,301 B2 | 4/2012 | Jiang |
| 8,546,018 B2 | 10/2013 | Kajiyama |
| 8,722,250 B2 | 5/2014 | Park |
| 9,293,766 B2 | 3/2016 | Liu et al. |
| 9,325,030 B2 | 4/2016 | Zidan |
| 9,525,173 B2 | 12/2016 | Kagei et al. |
| 9,575,025 B2 | 2/2017 | Nakayama et al. |
| 9,593,024 B2 | 3/2017 | Thackeray et al. |
| 9,692,084 B2 | 6/2017 | Yang et al. |
| 9,755,272 B2 | 9/2017 | Gaben |
| 9,768,450 B2 | 9/2017 | Song et al. |
| 9,843,041 B2 | 12/2017 | Lopez |
| 9,893,376 B2 | 2/2018 | Yang et al. |
| 9,947,916 B2 | 4/2018 | Oda |
| 9,960,458 B2 | 5/2018 | Weicker et al. |
| 9,997,774 B2 | 6/2018 | Hiratsuka |
| 10,199,649 B2 | 2/2019 | Beck et al. |
| 10,290,869 B2 | 5/2019 | Axelbaum |
| 10,629,902 B2 | 4/2020 | Yu |
| 2002/0110733 A1 | 8/2002 | Johnson |
| 2003/0022063 A1 | 1/2003 | Paulsen et al. |
| 2003/0129495 A1 | 7/2003 | Yamato et al. |
| 2003/0162086 A1 | 8/2003 | Longhi, Jr. et al. |
| 2004/0091779 A1 | 5/2004 | Kang et al. |
| 2005/0014065 A1 | 1/2005 | Jung et al. |
| 2005/0112466 A1 | 5/2005 | Jordy et al. |
| 2006/0160261 A1 | 7/2006 | Sheats |
| 2007/0238019 A1 | 10/2007 | Laurent et al. |
| 2008/0263855 A1 | 10/2008 | Li et al. |
| 2008/0264478 A1 | 10/2008 | Ahn et al. |
| 2009/0148764 A1 | 6/2009 | Kwak et al. |
| 2010/0108939 A1 | 5/2010 | Breger et al. |
| 2010/0233542 A1 | 9/2010 | Endo et al. |
| 2010/0248033 A1 | 9/2010 | Kumar et al. |
| 2011/0126402 A1 | 6/2011 | Kwak et al. |
| 2011/0129594 A1 | 6/2011 | Kwak et al. |
| 2011/0168944 A1 | 7/2011 | Chang et al. |
| 2011/0291043 A1 | 12/2011 | Wilcox et al. |
| 2011/0294015 A1 | 12/2011 | Pirk et al. |
| 2011/0311883 A1 | 12/2011 | Oukassi et al. |
| 2012/0183855 A1 | 7/2012 | Wohlfahrt-Mehrens et al. |
| 2012/0225199 A1 | 9/2012 | Muthu et al. |
| 2012/0270114 A1 | 10/2012 | Reynolds et al. |
| 2012/0312474 A1 | 12/2012 | Kwak et al. |
| 2012/0321815 A1 | 12/2012 | Song et al. |
| 2013/0040201 A1 | 2/2013 | Manthiram |
| 2013/0160283 A1 | 6/2013 | Wu |
| 2013/0260248 A1 | 10/2013 | Seki et al. |
| 2013/0298387 A1 | 11/2013 | Kobier et al. |
| 2014/0000100 A1 | 1/2014 | Oh et al. |
| 2014/0007418 A1 | 1/2014 | Song et al. |
| 2014/0120397 A1 | 5/2014 | Kim et al. |
| 2014/0154555 A1 | 6/2014 | Endoh et al. |
| 2014/0154581 A1 | 6/2014 | Kawasato et al. |
| 2014/0178748 A1 | 6/2014 | Chernyshov et al. |
| 2014/0227594 A1 | 8/2014 | Song et al. |
| 2014/0227609 A1 | 8/2014 | Frey et al. |
| 2014/0242463 A1 | 8/2014 | Song |
| 2014/0255603 A1 | 9/2014 | Xiao et al. |
| 2015/0010822 A1 | 1/2015 | Nakahara et al. |
| 2015/0010872 A1 | 1/2015 | Schindler et al. |
| 2015/0050522 A1 | 2/2015 | Manthiram et al. |
| 2015/0064558 A1 | 3/2015 | Seki et al. |
| 2015/0102530 A1 | 4/2015 | Wallace et al. |
| 2015/0180031 A1 | 6/2015 | Thackeray et al. |
| 2015/0188186 A1 | 7/2015 | Bedjaoui et al. |
| 2015/0280201 A1 | 10/2015 | Bhardwaj |
| 2016/0164088 A1 | 6/2016 | Peralta et al. |
| 2016/0164092 A1 | 6/2016 | Stottlemyer |
| 2016/0218362 A1 | 7/2016 | Kagei et al. |
| 2016/0218364 A1 | 7/2016 | Sakai et al. |
| 2016/0254539 A1 | 9/2016 | Kagei et al. |
| 2016/0294010 A1 | 10/2016 | Herb et al. |
| 2016/0372783 A1 | 12/2016 | Min et al. |
| 2017/0133678 A1 | 5/2017 | Ozoemena et al. |
| 2019/0044182 A1 | 2/2019 | Maeda et al. |
| 2019/0115627 A1 | 4/2019 | Rendall |
| 2019/0334171 A1 | 10/2019 | Ozoemena |
| 2020/0220221 A1 | 7/2020 | Keyzer et al. |
| 2020/0280099 A1 | 9/2020 | Keyzer et al. |
| 2020/0335786 A1 | 10/2020 | Roberts et al. |
| 2020/0377376 A1 | 12/2020 | Roberts et al. |
| 2020/0381724 A1 | 12/2020 | Roberts et al. |
| 2020/0381725 A1 | 12/2020 | Roberts et al. |
| 2020/0381726 A1 | 12/2020 | Roberts et al. |

FOREIGN PATENT DOCUMENTS

| | | |
|---|---|---|
| CN | 1458706 A | 11/2003 |
| CN | 1464573 A | 12/2003 |
| CN | 1610154 A | 4/2005 |
| CN | 101128941 A | 2/2008 |
| CN | 101562245 A | 10/2009 |
| CN | 101694876 A | 4/2010 |
| CN | 101855770 A | 10/2010 |
| CN | 102054986 A | 5/2011 |
| CN | 102074700 A | 5/2011 |
| CN | 102881873 A | 1/2013 |
| CN | 103035900 A | 4/2013 |
| CN | 103066274 A | 4/2013 |
| CN | 103311513 A | 9/2013 |
| CN | 103545519 A | 1/2014 |
| CN | 103887562 A | 6/2014 |
| CN | 105047898 A | 11/2015 |
| CN | 105742607 A | 7/2016 |
| CN | 105810934 A | 7/2016 |
| CN | 103943844 B | 8/2016 |
| CN | 106410186 A | 2/2017 |
| CN | 106573795 A | 4/2017 |
| CN | 104241633 B | 9/2017 |
| DE | 4227720 A1 | 4/1993 |
| EP | 1189296 A2 | 3/2002 |
| EP | 2746288 A1 | 6/2014 |
| EP | 2763219 A2 | 8/2014 |
| EP | 2827430 A1 | 1/2015 |
| EP | 3093272 A1 | 11/2016 |
| GB | 1402544 A | 8/1975 |
| GB | 2128604 A | 5/1984 |
| JP | 45-035555 | 11/1970 |
| JP | 57-96472 A | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |
| JP | 2005-100947 A | 4/2005 |
| JP | 2005-150093 A | 6/2005 |
| JP | 2005-150102 A | 6/2005 |

(56) References Cited

FOREIGN PATENT DOCUMENTS

| | | | |
|---|---|---|---|
| JP | 2006-294597 A | 10/2006 | |
| JP | 2007-503102 A | 2/2007 | |
| JP | 2009-182273 A | 8/2009 | |
| JP | 2009-246236 A | 10/2009 | |
| JP | 2009-544141 A | 12/2009 | |
| JP | 2010-251075 A | 11/2010 | |
| JP | 2011-108603 A | 6/2011 | |
| JP | 2012-129166 A | 7/2012 | |
| JP | 2013-506945 A | 2/2013 | |
| JP | 2014-510372 A | 4/2014 | |
| JP | 2014-112476 A | 6/2014 | |
| JP | 2014-146458 A | 8/2014 | |
| JP | 2014-529176 A | 10/2014 | |
| JP | 2014-531718 A | 11/2014 | |
| JP | 2014-531719 A | 11/2014 | |
| JP | 2017-521848 A | 8/2017 | |
| KR | 10-2004-0096063 A | 11/2004 | |
| KR | 10-2014-0081468 A | 7/2014 | |
| KR | 10-2016-0091172 A | 8/2016 | |
| KR | 10-2017-0008540 A | 1/2017 | |
| KR | 10-2017-0025874 A | 3/2017 | |
| TW | 201145648 A | 12/2011 | |
| WO | 2006/027925 A2 | 3/2006 | |
| WO | 2006/071972 A2 | 7/2006 | |
| WO | 2009/055529 A1 | 4/2009 | |
| WO | 2010/036723 A1 | 4/2010 | |
| WO | 2011/039132 A1 | 4/2011 | |
| WO | 2011/052607 A1 | 5/2011 | |
| WO | 2012/065767 A1 | 5/2012 | |
| WO | 2013/021955 A1 | 2/2013 | |
| WO | 2013/035519 A1 | 3/2013 | |
| WO | 2013/118659 A1 | 8/2013 | |
| WO | 2013/146723 A1 | 10/2013 | |
| WO | 2015/007586 A1 | 1/2015 | |
| WO | 2015/053357 A1 | 4/2015 | |
| WO | 2015/107194 A1 | 7/2015 | |
| WO | 2016/001884 A1 | 1/2016 | |
| WO | 2016/210419 A1 | 12/2016 | |
| WO | 2017/047280 A1 | 3/2017 | |
| WO | 2017/087403 A1 | 5/2017 | |

OTHER PUBLICATIONS

Zhang et al. English machine translation of CN105047898A. (Year: 2015).*
Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.
Cucinella et al. (1982). "Calcium Alkoxyalanates I. Synthesis and Physicochemical Characterization," Journal of Organometallic Chemistry 224(1): 1-12.
Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.
International Search Report and Written Opinion dated Apr. 15, 2019, directed to International Application No. PCT/GB2018/053657; 17 pages.
Lu et al. (Apr. 2002). "Synthesis, Structure, and Electrochemical Behavior of Li[NixLi(⅓-2x/3)Mn(⅔-x/3)]O2," Journal of the Electrochemical Society, 149(6): A778-A791.
Mehrotra et al. (Jan. 1978). "Preparation and Characterization of Some Volatile Double Isopropoxides of Aluminium with Alkaline Earth Metals," Inorganica Chemica Acta 29:131-136.
Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.
Park et al. (Apr. 2004). "Structural investigation and electrochemical behaviour of Li[NixLi(⅓-2x/3)Mn(⅔-x/3)]O2 compounds by a simple combustion method," Journal of Power Sources 129: 288-295.

Park et al. (May 2010). "Suppression of O2 evolution from oxide cathode for lithium-ion batteries: VOx-impregnated 0.5Li2MnO3-0.5LiNi0.4Co0.2Mn0.4O2 cathode," Chemical Communications, 46(23): 4190-4192.
Search Report dated Jun. 28, 2018, directed to GB Application No. 1721178.0; 2 pages.
Thackeray et al. (Aug. 2006). "Comments on the structural complexity of lithium-rich Li1+xM1-xO2 electrodes (M+Mn, Ni, Co) for lithium batteries," Electrochemistry Communications 8(9):1531-1538.
Turova et al. (1977). "Hydrolysis and Alcoholysis of Alkali Metal Aluminium Hydrides," Inorganica Chimica Acta, 21: 157-161.
Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.
Yasushi et al. (Nov. 16, 1984) "CAS No. 32843-22-4] Aluminate (1-), tetrakis(diphenylaminato)-, magnesium," (2 pages).
Notification of Reason(S) for Refusal received for Korean Application No. 10-2020-7018773, dated Sep. 23, 2021, 12 pages (6 pages of English Translation and 6 pages of Original Document).
Office Action received for Japanese Patent Application No. 2020-552161, dated Sep. 7, 2021, 4 pages (2 pages of English Translation and 2 pages of Original Document).
Office Action received for Japanese Patent Application No. 2020-552159, dated Sep. 7, 2021, 4 pages (2 pages of English Translation and 2 pages of Original Document).
Office Action received for Korean Patent Application No. 10-2020-7018774, dated Sep. 23, 2021, 10 pages (5 pages of English Translation and 5 pages of Original Document).
Office Action received for Japanese Patent Application No. 2020552156 dated Sep. 7, 2021, 12 pages (6 pages of English Translation and 6 pages of Original Document).
Meese-Marktscheffel et al., "Magnesium-aluminum alkoxides: the synthesis of Mg[Al(OR)4]2 (R=Busec and Ph), structure of (thf)2Mg[(µ-OPh)2Al (OPh))2]2, and dynamic NMR of Mg[Al(OBusec)4]2", Polyhedron, 1994, vol. 13, No. 6-7, pp. 1045-1050.
Office Action received for Japanese Application No. 2020-515116, dated Oct. 12, 2021, 4 pages (2 pages of English Translation and 2 pages of Original Document).
Office Action received for Chinese Patent Application No. 201880081413.3, dated Mar. 15, 2022, 17 pages (10 pages of English Translation and 7 pages of Original Document).
Park et al., "The Effects of Ni Doping on the Performance of O3-Lithium Manganese Oxide Material", Korean J. Chem. Eng., vol. 21, No. 5, 2004, pp. 983-988.
Peretich, A.L., Amenta, D.S., Gilje, J.W. et al. "Crystal Structure of [Me2NCH(O)]2Mg[(Ij-OPri)2Al(OPri)2]2". J Chem Crystallogr40, 716-719 (2010). https://doi.org/10.1007/s10870-010-9783-x.
Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.
International Search Report and Written Opinion received for PCT Patent Application No. PCT/GB2018/052537, dated Dec. 19, 2018, 17 pages.
International Search Report and Written Opinion received for PCT Patent Application No. PCT/GB2018/052538, dated Oct. 29, 2018, 11 pages.
International Search Report and Written Opinion received for PCT Patent Application No. PCT/GB2018/053655, dated Apr. 8, 2019, 15 pages.
International Search Report and Written Opinion received for PCT Patent Application No. PCT/GB2018/053656, dated Feb. 15, 2019, 11 pages.
International Search Report and Written Opinion received for PCT Patent Application No. PCT/GB2018/053659, dated Apr. 8, 2019, 16 pages.
International Search Report and Written Opinion received for PCT Patent Application No. PCT/GB2018/053660, dated Feb. 14, 2019, 9 pages.
International Search Report and Written Opinion received for PCT Patent Application No. PCT/GB2018/053663, dated Sep. 15, 2019, 10 pages.

(56) References Cited

OTHER PUBLICATIONS

Office Action received for Japanese Patent Application No. 2020-552157, dated Jun. 21, 2021, 10 pages (5 pages of English Translation and 5 pages of Original Document).
Office Action received for Japanese Patent Application No. 2020-552160, dated Jul. 5, 2021, 5 pages (2 pages of English Translation and 3 pages of Original Document).
Office Action received for Korean Patent Application No. 10-2020-7010108, dated Jul. 28, 2021, 10 pages (5 pages of English Translation and 5 pages of Original Document).
Office Action received for Korean Patent Application No. 10-2020-7010109, dated Jul. 28, 2021, 10 pages (5 pages of English Translation and 5 pages of Original Document).
Search Report dated Jun. 28, 2018, directed to GB Application 1721179.8; 2 pages.
Search Report dated Jun. 28, 2018, directed to GB Application No. 1721177.2; 2 pages.
Search Report dated Jun. 28, 2018, directed to GB Application No. 1721180.6; 2 pages.
Search Report dated May 30, 2018, directed to GB Application No. 1714770.3; 2 pages.
Search Report dated May 30, 2018, directed to GB Application No. 1714771.1; 2 pages.
Breger et al "High-resolution X-ray diffraction, DIFFaX, NMR and first principles study of disorder in the $Li_2MnO_3$-$Li[Ni_{1/2}Mn_{1/2}]O_2$ solid solution", Journal of Solid State Chemistry 178 (2005) 2575-2585.
Jiang et al "Electrochemical and structural study of the layered, "Li-excess" lithium-ion battery electrode material $Li[Li_{1/9}Ni_{1/3}Mn_{5/9}]O_2$", Chem. Mater. 2009, 21, 2733-2745.
Kim et al.; "Synthesis and electrochemical behavior of $Li[Li_{0.1}Ni_{0.35-x/2}Co_xMn_{0.55-x/2}]O_2$ cathode materials"; Solid State Ionics 164, pp. 43-49. (Year: 2003).
Kim et al.; ("Electrochemical properties of $Li[Li_{(1-x)/3}Co_xMn_{(2-2x)/3}]O_2$ ($0<x<1$) solid solutions prepared by poly-vinyl alcohol method"; Electrochemistry Communications 9, pp. 103-108. (Year: 2007).
Office Action received for Japanese Patent Application No. 2020-552157, dated Jan. 25, 2022, 5 pages (2 pages of English Translation and 3 pages of Original Document).
Sun et al.;"The preparation and electrochemical performance of solid solutions $LiCoO_2$-$Li_2MnO_3$ as cathode materials for lithium ion batteries"; Electrochimica Acta 51, pp. 5581-5586. (Year: 2006).
Thackeray et al. "$Li_2MnO_3$-stabilized $LiMO_2$ (M=Mn, Ni, Co) electrodes for lithium-ion batteries'"; J. of Materials Chemistry, vol. 17, No. 30, pp. 3053-3272. (Year: 2007).
Xiang et al.; "Understanding the Influence of Composition and Synthesis Temperature on Oxygen Loss, Reversible Capacity, and Electrochemical Behavior of $xLi_2MnO_3$ $(1-x)LiCoO_2$ Cathodes in the First Cycle"; J. Phys. Chem. 118, pp. 23553-23558. (Year: 2014).
Lee et al., "High capacity $Li[Li_{0.2}Ni_{0.2}Mn_{0.6}]O_2$ cathode materials via a carbonate co-precipitation method," Journal of Power Sources, vol. 162, No. 2, Sep. 12, 2006, pp. 1346-1350.
Office Action received for Chinese Patent Application No. 201880081264.0, dated Feb. 7, 2022, 19 pages (11 pages of English Translation and 8 pages of Original Document).
Office Action received for Japanese Patent Application No. 2020-552158, dated Aug. 10, 2022, 8 pages (3 pages of English Translation and 5 pages of Original Document).
Office Action received for Korean Patent Application No. 10-2020-7018911, dated Feb. 14, 2022, 16 pages (8 pages of English Translation and 8 pages of Original Document).
Office Action received for Korean Patent Application No. 10-2020-7018912, dated Aug. 17, 2022, 10 pages (5 pages of English Translation and 5 pages of Original Document).
Office Action received for Korean Patent Application No. 10-2020-7018912, dated Feb. 14, 2022, 16 pages (8 pages of English Translation and 8 pages of Original Document).
Jang et al., Electrochemical and Solid-State Letters, 1 (1)13-16 (1998) (Year: 1998).
Feng-Min et al., "Recent Developments on Li-ion Batteries positive materials," Battery Bimonthly, vol. 33, No. 6, Dec. 30, 2003, 3 pages.
Hu et al., "Electric Vehicles 3rd Edition" Section 2 Power Battery, vol. 3, Jan. 31, 2003, 12 pages.
Office Action received for Chinese Patent Application No. 201880081278.2, dated Jan. 26, 2022, 18 pages (10 pages of English Translation and 8 pages of Original Document).
Second Office Action received for Chinese Patent Application No. 201880081278.2, dated Jun. 29, 2022, 20 pages (13 pages of English Translation and 7 pages of Original Document).
Third Office Action received for Chinese Patent Application No. 201880081278.2, dated Oct. 19, 2022, 14 pages (9 pages of English Translation and 5 pages of Original Document).

* cited by examiner

USE OF NICKEL IN A LITHIUM RICH CATHODE MATERIAL FOR SUPPRESSING GAS EVOLUTION FROM THE CATHODE MATERIAL DURING A CHARGE CYCLE AND FOR INCREASING THE CHARGE CAPACITY OF THE CATHODE MATERIAL

REFERENCE TO RELATED APPLICATIONS

This application is a national stage application under 35 U.S.C. 371 of International Application No. PCT/GB2018/053657, filed Dec. 18, 2018, which claims the priority of United Kingdom Application No. 1721178.0, filed Dec. 18, 2017, the entire contents of each of which are incorporated herein by reference.

FIELD OF THE DISCLOSURE

The present invention relates to a set of electroactive cathode compounds. More specifically the present invention relates to the use of a set of high capacity nickel containing lithium rich cathode compounds.

BACKGROUND OF THE DISCLOSURE

Conventional lithium ion batteries are limited in performance by the capacity of the material used to make the positive electrode (cathode). Lithium rich blends of cathode materials containing blends of nickel manganese cobalt oxide offer a trade-off between safety and energy density. It is understood that charge is stored in the transition metal cations within such cathode materials. It has been suggested that the capacity, and therefore energy density, of cathode materials could be significantly increased if charge could be stored on anions (for example oxygen) reducing the need for such high amounts of heavy transition metal ions. However, a challenge remains to provide a material that can rely on the redox chemistries of both the anions and cations to store charge, and withstand charge/discharge cycles without compromising the safety of the material, or causing undesired redox reactions which would break down the material.

SUMMARY OF THE DISCLOSURE

In a first aspect, the present invention relates to the use of nickel in a cathode material of the general formula:

for suppressing gas evolution during a charge cycle.

In a particular embodiment of the use x is greater than 0.06 and equal to or less than 0.4; y is equal to or greater than 0 and equal to or less than 0.4; and z is equal to or greater than 0 and equal to or less than 0.05.

In a second aspect, the present invention relates to the use of nickel in a cathode material of the general formula:

for increasing the charge capacity of the material.

In a particular embodiment of the use x is greater than 0.06 and equal to or less than 0.4; y is equal to or greater than 0 and equal to or less than 0.4; and z is equal to or greater than 0 and equal to or less than 0.05.

It has been found that a compound with an improved capacity can be achieved by reducing the amount of excess lithium and increasing the amount of nickel. Nickel can thus be used to increase the capacity of the NMC-type cathode material. The particular compound as defined above exhibits a significantly large increase in capacity due to the degree of oxidation of the transition metal nickel and also the oxidation of the oxide ions within the lattice. Without wishing to be bound by theory, it is understood that the presence of a particular amount of nickel substitution enables greater oxygen redox activity and thereby improves the electrochemical capacity of the material.

In addition, the compounds of the present invention exhibit improved stability during electrochemical cycling when compared to the transition metal substituted NMC lithium rich materials of the prior art. The evolution of molecular oxygen is ubiquitous with third row lithium-rich materials transition metal oxides where lithium has been exchanged for some of the transition metal ions ($Li_{1+x}M_{1-x}O_2$, where M is Ti, V, Cr, Mn, Fe, Co, Ni, Cu or Zn). These materials generally rely on oxygen redox to improve their charge capacity properties.

Homogenous materials can suffer from molecular oxygen escaping from the crystal structure during cycling due to redox of the oxide anion. In turn, this reduces the capacity and useful lifetime of the material. However, the material of the present invention has improved capacity which is maintained over numerous cycles.

The gas may be molecular oxygen and/or carbon dioxide It is understood that when the charge imbalance caused by the removal of a lithium ion is balanced by the removal of an electron from the oxygen anion the resulting oxygen anion is unstable which results in undesired redox reactions and the evolution of molecular oxygen gas during charge cycling. Carbon dioxide may also be produced due to reactions of oxygen escaping from the lattice with the electrolytic solvent (e.g. propylene carbonate). Without wishing to be bound by theory, it is understood that the specific nickel content in the material relative to the lithium content avoids under-bonding within the lattice such that each oxygen anion is still bonded to ~3 cations. A potential solution to this problem might be to encapsulate the cathode layer or part of the cell in a gas impermeable membrane. However, this would add parasitic mass to the cell, thereby reducing the energy density of the resulting battery. However, the chemical approach of the present invention tunes the structure of the lattice using specific amounts of transition metals reduces the generation of oxygen gas from the material without the need to add layers to the cathode material or resulting battery cell.

In a particular embodiment y and z are both equal to 0; and x is equal to or greater than 0.3 and equal to or less than 0.4. Thus, the cathode material may be selected from one of $Li_{1.333}Ni_{0.3}Mn_{0.5667}O_2$ or $Li_{1.066}Ni_{0.4}Mn_{0.533}O_2$.

In a particular embodiment z is equal to 0; x is equal to 0.2; and y is equal to or greater than 0.15 and equal to or less than 0.2. Thus, the cathode material may be selected from one of $Li_{1.1333}Co_{0.2}Ni_{0.2}Mn_{0.4667}O_2$ or $Li_{1.15}Co_{0.15}Ni_{0.2}Mn_{0.5}O_2$.

In a particular embodiment x is equal to 0.2; z is equal to 0.05; and y is equal to or greater than 0.1 and equal to or less than 0.15. Thus, the cathode material may be selected from one of $Li_{1.15}Ni_{0.2}Co_{0.1}Al_{0.05}Mn_{0.5}O_2$ or $Li_{1.333}Ni_{0.2}Co_{0.15}Al_{0.05}Mn_{0.4667}O_2$.

These particular compounds have demonstrated a low gas evolution and an improved capacity for charge with good stability over a number of cycles.

The compound may be defined as having a layered structure. Typically layered structures have been shown to have the highest energy density. When in the layered form, the material can be further defined using the general formula $(1-a-b-c)Li_2MnO_3 \cdot aLiCoO_2 \cdot bLiNioMn_{0.5}O_2 \cdot cLiAlO_2$ such that a, b and c equate to values of the general formulae above.

BRIEF DESCRIPTION OF THE FIGURES

In order that the present invention may be more readily understood, an embodiment of the invention will now be described, by way of example, with reference to the accompanying Figures, in which:

FIG. 4 shows first cycle galvanostatic load curves for the synthesised materials according to Example 1a;

DETAILED DESCRIPTION OF THE DISCLOSURE

The present invention will now be illustrated with reference to the following examples.

Example 1—Synthesis of the Nickel Substituted Lithium Rich Materials

1a) The Formaldehyde-Resorcinol sol gel synthetic route was employed to synthesise materials with general formula with x=0, 0.06, 0.12, 0.2, 0.3 and 0.4 all the reagents ratios were calculated in order to obtain 0.01 mol of the final product.

Stoichiometric amounts of $CH_3COOLi \cdot 2H_2O$ (98.0%, Sigma Aldrich®), $(CH_3COO)_2Mn \cdot 4H_2O$ (>99.0%, Sigma Aldrich®) and $(CH_3COO)_2Ni \cdot 4H_2O$ (99.0% Sigma Aldrich® were dissolved in 50 mL of water with 0.25 mmol of $CH_3COOLi \cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for one hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Figure 2A:
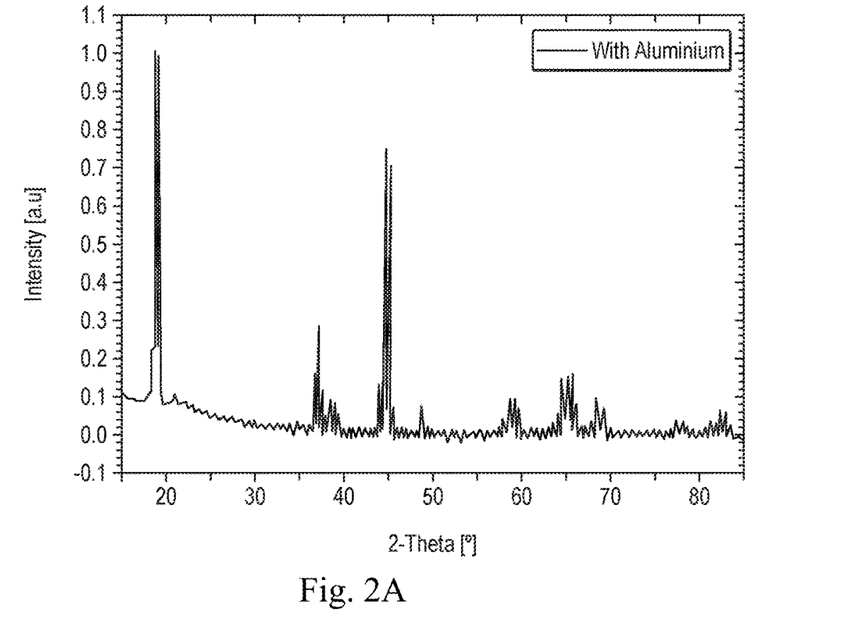
FIGS. 2A-2B shows powder X-ray Diffraction patterns of the synthesised materials according to Example 1b.
Figure 2B:
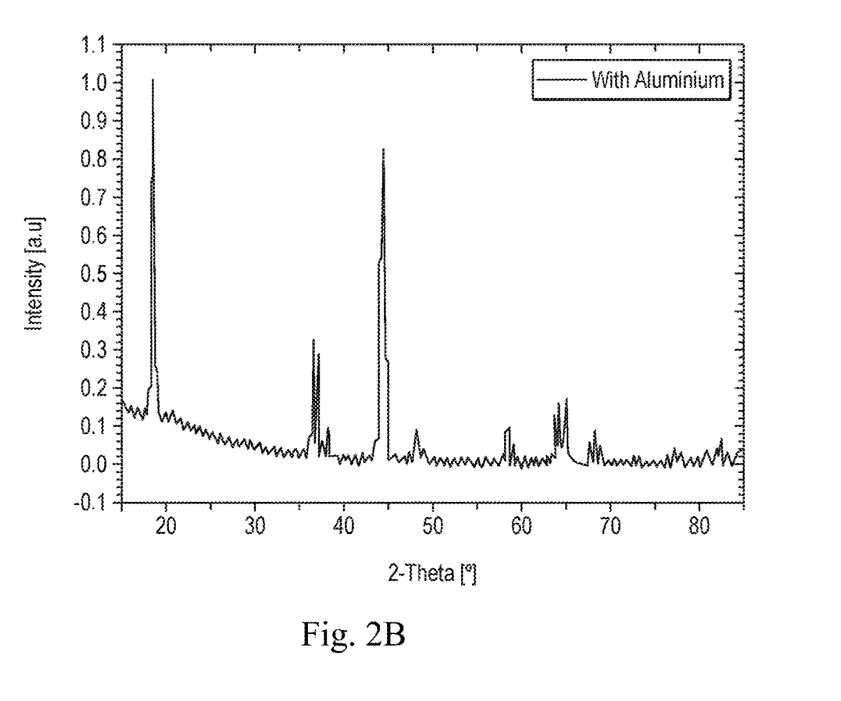
Figure 5A:
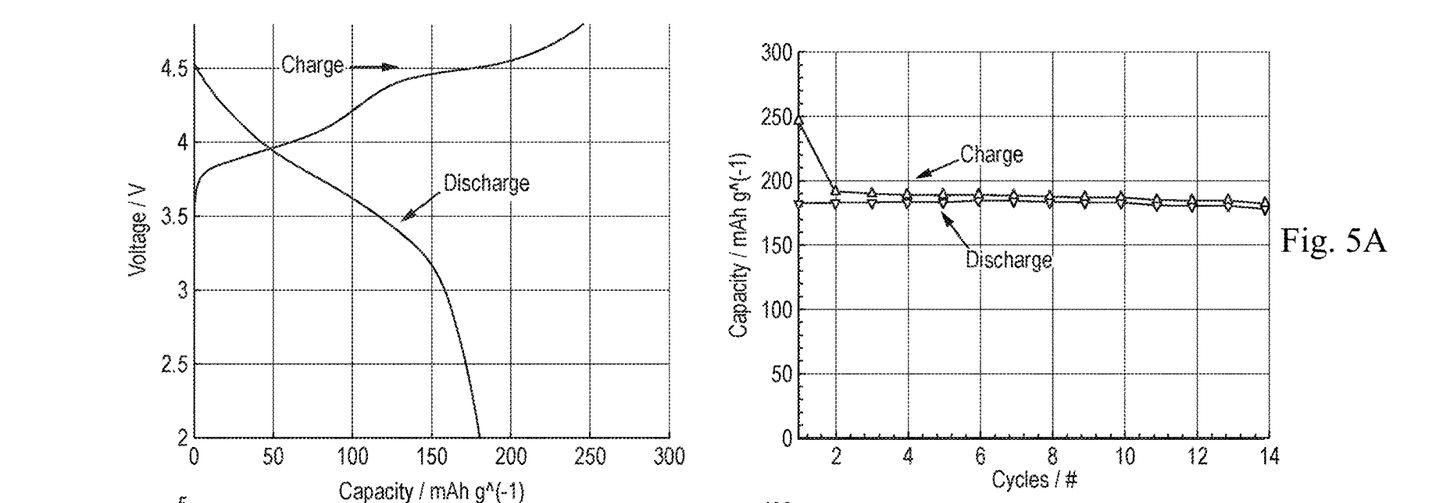
FIGS. 5A-5B shows first cycle galvanostatic load curves for the synthesised materials according to Example 1b.
Figure 5B:
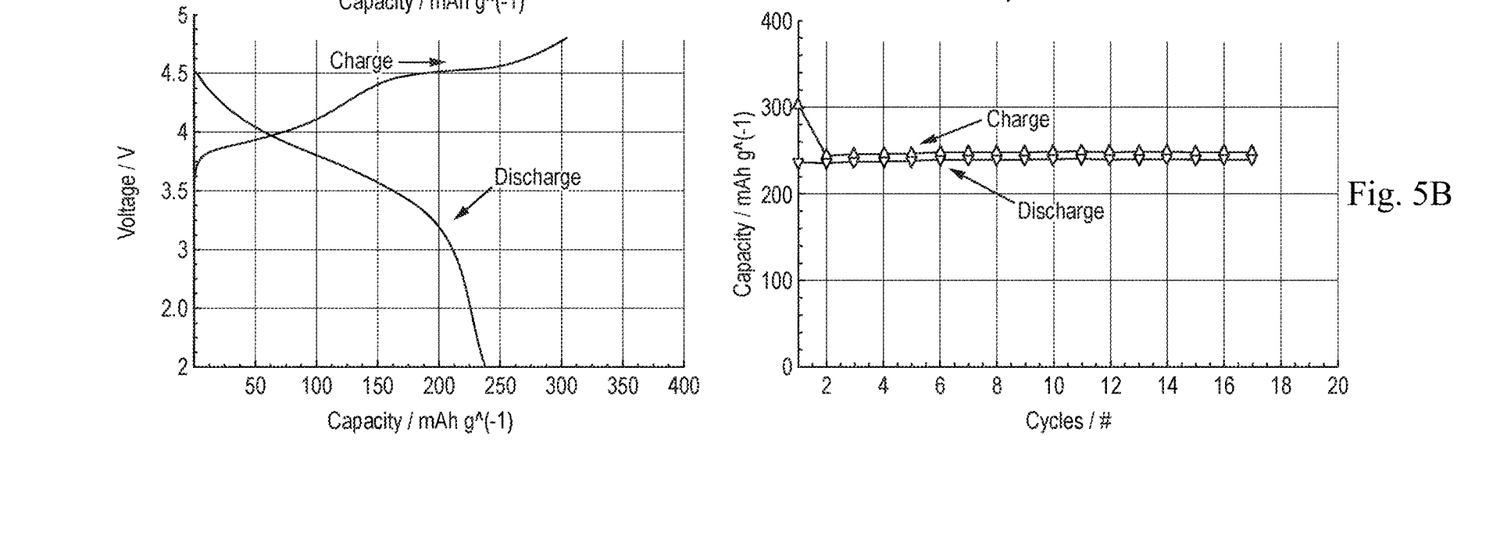

1b) For cobalt-containing cathode material doped with nickel, The Formaldehyde-Resorcinol sol gel synthetic route was employed to synthesise materials with general formula with a composition where x=0.2 y=0.2 (composition in FIGS. 2A and 5A) and with a composition where x=0.2 y=0.15 (composition in FIGS. 2B and 5B). All the reagents ratios were calculated in order to obtain 0.01 mol of the final product.

Stoichiometric amounts of $CH_3COOLi \cdot 2H_2O$ (98.0%, Sigma Aldrich®), $(CH_3COO)_2Mn \cdot 4H_2O$ (>99.0%, Sigma Aldrich®) $(CH_3COO)_2Ni \cdot 4H_2O$ (99.0% Sigma Aldrich® and $(CH_3COO)_2Co \cdot 4H_2O$ (99.0% Sigma Aldrich®) were dissolved in 50 mL of water with 0.25 mmol of $CH_3COOLi \cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for one hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Figure 3A:
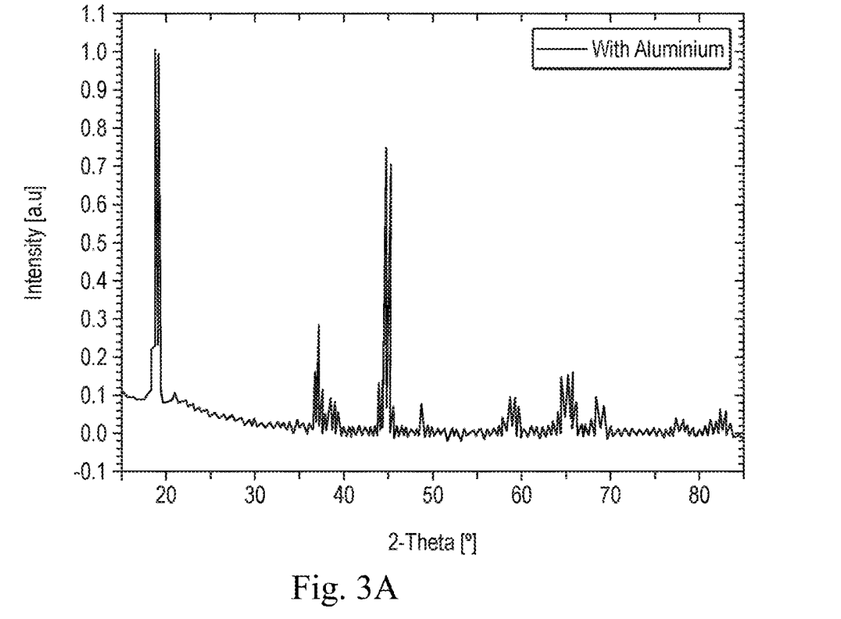
FIGS. 3A-3B shows powder X-ray Diffraction patterns of the synthesised materials according to Example 1c.
Figure 3B:
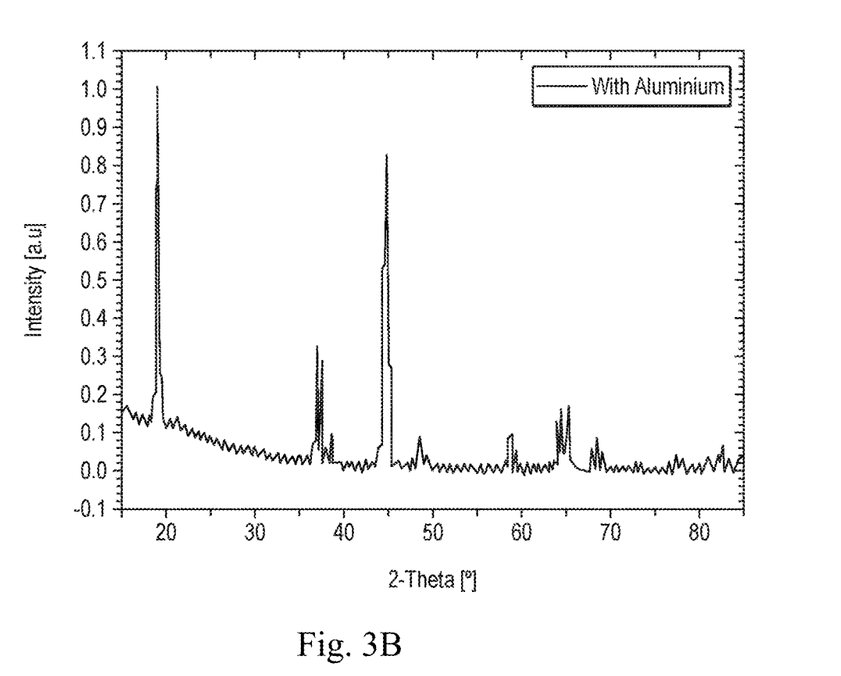
Figure 6A:
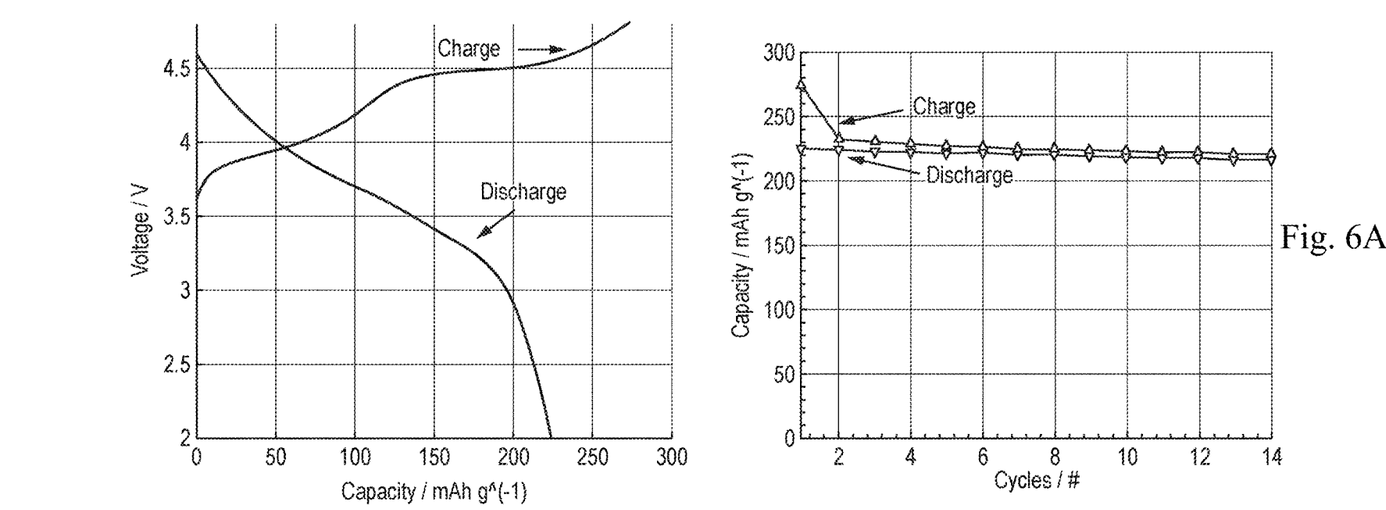
FIGS. 6A-6B shows first cycle galvanostatic load curves for the synthesised materials according to Example 1c.
Figure 6B:
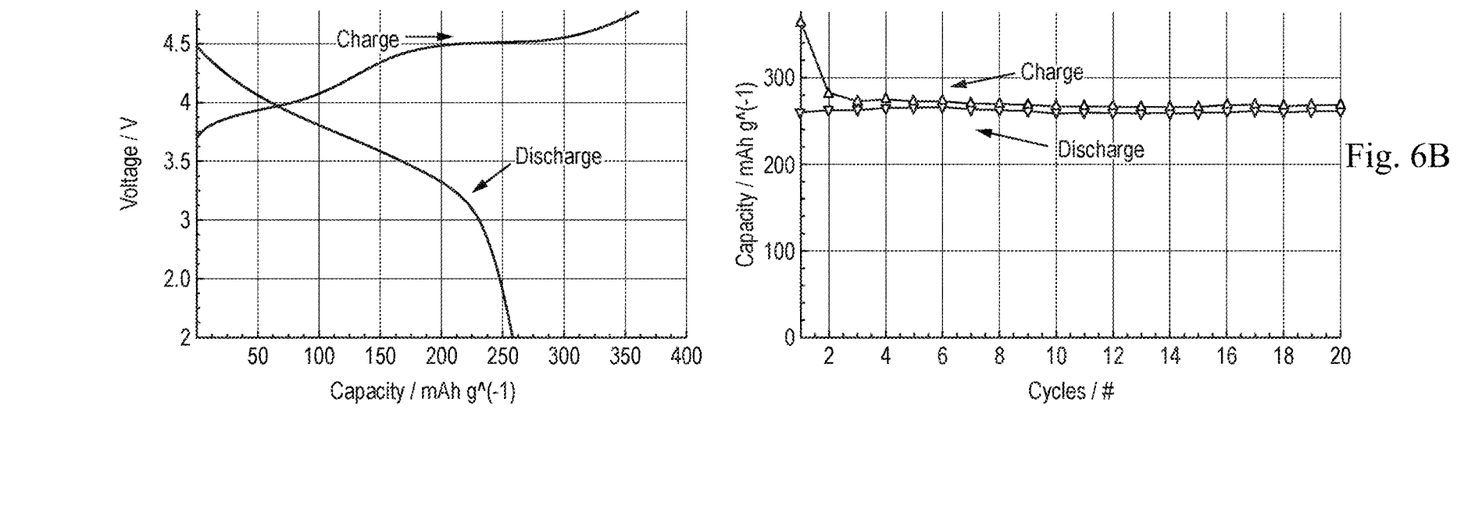

1c) For cobalt-aluminium-containing cathode material doped with nickel, the Formaldehyde-Resorcinol sol gel synthetic route was employed to synthesise materials with general formula with a composition having x=0.2 y=0.15 z=0.05 (composition in FIGS. 3A and 6A); and with a composition having x=0.2 y=0.1 z=0.05 (composition in FIGS. 3B and 6B).

All the reagents ratios were calculated in order to obtain 0.01 mol of the final product.

Stoichiometric amounts of $CH_3COOLi \cdot 2H_2O$ (98.0%, Sigma Aldrich®), $(CH_3COO)_2Mn \cdot 4H_2O$ (>99.0%, Sigma Aldrich®), $(CH_3COO)_2Co \cdot 4H_2O$ (99.0% Sigma Aldrich®), $Al_2(SO_4)_3 \cdot 4H_2O$ (Sigma Aldrich®) and $(CH_3COO)_2Ni \cdot 4H_2O$ (99.0% Sigma Aldrich®) were dissolved in 50 mL of water with 0.25 mmol of $CH_3COOLi \cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for 1 hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Example 2—Structural Analysis and Characterisation of the Nickel Substituted Lithium Rich Materials The materials according to Example 1a-c were examined with Powder X-Ray Diffraction (PXRD) which was carried out utilising a Rigaku® SmartLab equipped with a 9 kW Cu rotating anode; and MAS-NMR spectra were collected on the materials with a Bruker Avance III 400WD magnet.

Figure 1:
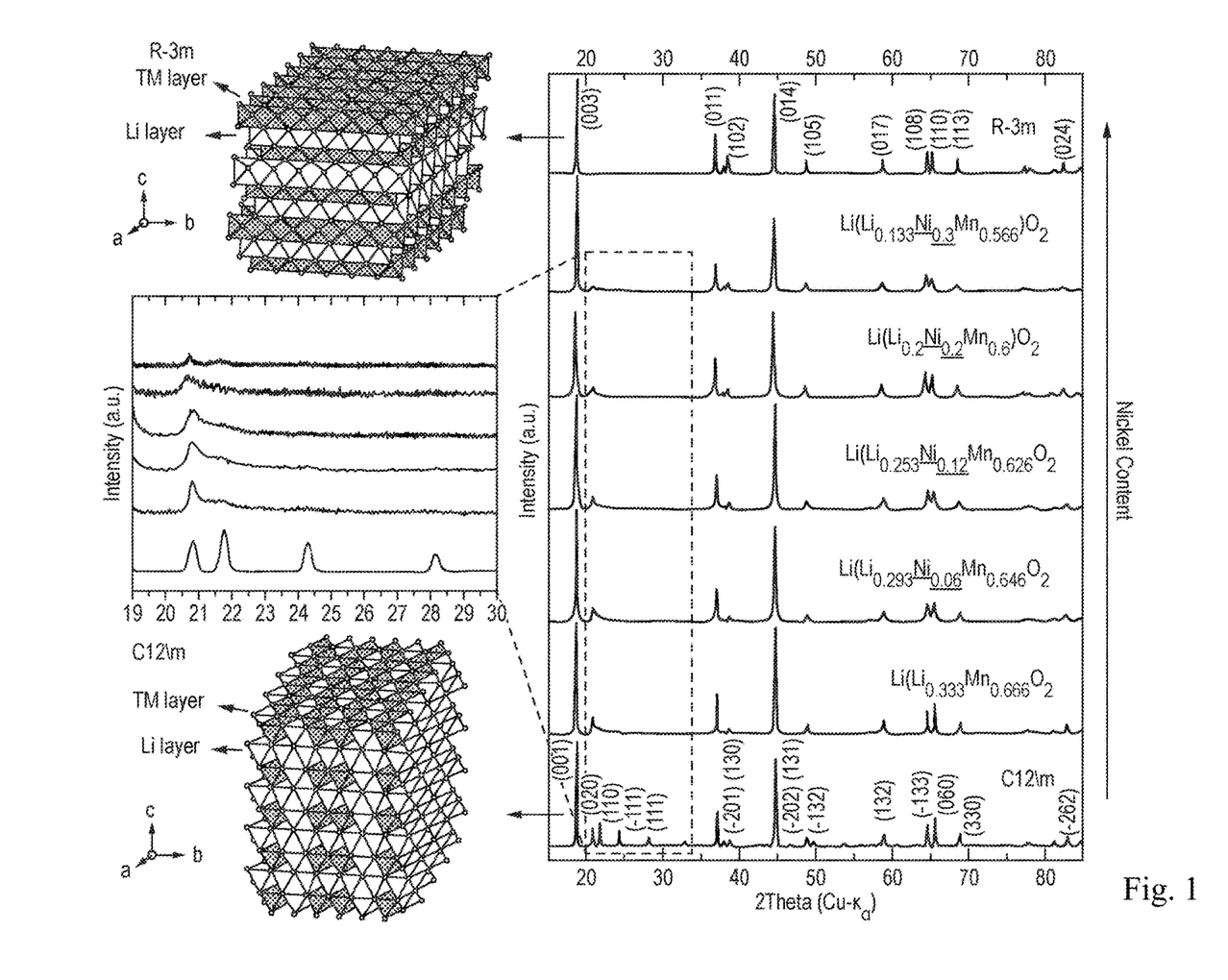
FIG. 1 shows powder X-ray Diffraction patterns of the synthesised materials according to Example 1a compared with the calculated patterns of the C12/m and R-3m symmetry lattice shown at the bottom and top of the figure respectively.

FIGS. 1 (nickel doped $Li_2MnO_2$), 2A and 2B (nickel doped cobalt compositions 1 and 2, respectively) and 3A and 3B (nickel doped aluminum cobalt compositions 1 and 2, respectively) show Powder X-ray Diffraction patterns of the synthesized materials. These are characteristic of layered materials with some cation ordering in the transition layer. All of the patterns appear to show the major peaks consistent with a close-packed layered structure such as $LiTMO_2$ with a R-3m space group. Additional peaks are observed in the range 20-30 2Theta degrees which cannot be assigned to the R-3m space. The order derives from the atomic radii and charge density differences between $Li^+$ (0.59 Å), $Ni^{+2}$ (0.69 Å) and $Mn^{4+}$ (0.83 Å) and appears the strongest in the structures of the low nickel doped oxides. The peaks are not as strong as in materials where a perfect order exists as in $Li_2MnO_3$. No presence of extra-peaks due to impurities was observed.

Example 3—Electrochemical Analysis of the Nickel Substituted Lithium Rich Materials The materials according to Example 1a-c were characterised electrochemically through galvanostatic cycling performed with a BioLogic VMP3 and a Maccor 4600 series potentiostats. All the samples were assembled into stainless steel coincells against metallic lithium and cycled between 2 and 4.8 V vs. $Li^+/Li$ for 100 cycles at a current rate of 50 mAg-1. The electrolyte employed was LP30 (a 1M solution of $LiPF_6$ in 1;1 w/w ratio of EC;DMC).

FIGS. 4, 5A-5B, and 6A-6B show the potential curves during the charge and subsequent discharge of the first cycle for each material according to Example 1.

Figure 4:
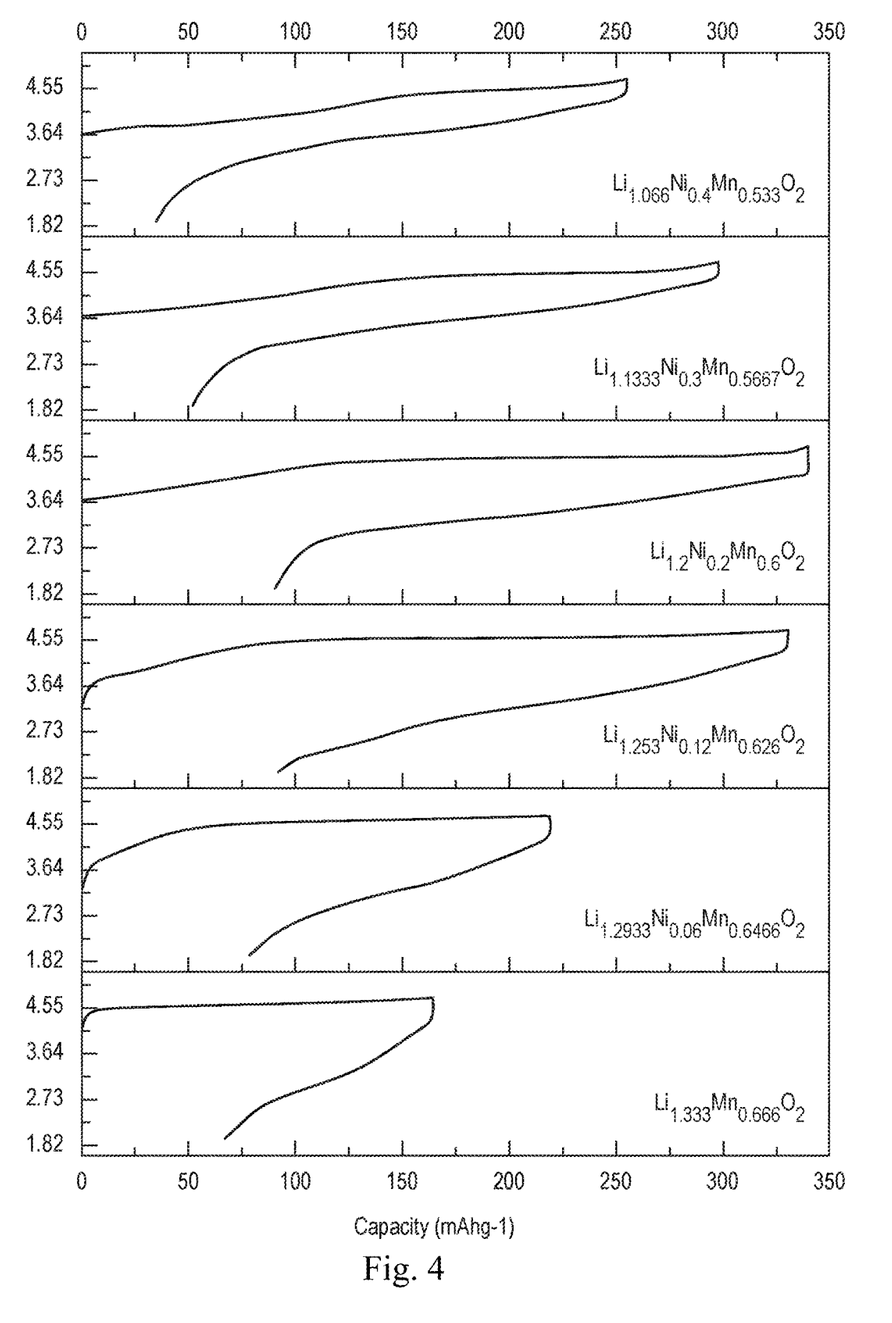

FIG. 4 shows the potential curves during the charge and subsequent discharge of the first cycle for each material according to Example 1a. All of the samples present a high voltage plateau of different lengths centred on 4.5 V vs. $Li^+/Li^0$, whereas the presence of a sloped region at the beginning of the charge progressively increases in length with the amount of nickel doping. The extension of this region may be attributed to the oxidation of nickel from $Ni^{+2}$ toward $Ni^{+4}$. appears to be in good agreement with the amount of lithium (i.e. charge) that would be extracted accounting for solely the nickel redox activity. Hence, as expected, $Li_2MnO_3$ does not show any pre-plateau region whilst the $Li_{(4/3-2x/3)}Ni_xMn_{(2/3-x/3)}O_2$ $x = 0.3$ doped oxide presents more than 150 mAhg$^{-1}$.

During the first discharge, none of the materials show the presence of a reversible plateau, indicating a difference in the thermodynamic pathways followed during the extraction (charge) and insertion (discharge) of lithium ions from/in the lattice of each sample.

For all the material according to Example 1a the first cycle presents the lowest coulombic efficiency value due to the presence of the high potential plateau which is not reversible. The coulombic efficiencies appear to quickly improve from the first cycle values, around 60-70%, to values higher than 98% within the first five cycles. However, with this regard $Li_2MnO_3$ and $Li_{(4/3-2x/3)}Ni_xMn_{(2/3-x/3)}O_2$ with x=0.06 are an exception, showing an initial loss in efficiency. When the nickel substitution increases such that x=0.12 a significant improvement in the electrochemical performance is seen, indicating that there is a change in the nature of the charge storage mechanism.

FIGS. 5A-5B (nickel doped cobalt cathode materials) show the potential curves during the charge and subsequent discharge of the first cycle for materials according to Example 1b. Both samples present a high voltage plateau of different lengths centered on 4.5 V vs. $Li^+/Li^0$, and a sloped region at the beginning of the charge. The length of this region may be attributed to the oxidation of nickel from $Ni^{+2}$ toward $Ni^{+4}$ and $Co^{+3}$ toward $Co^{+4}$ and appears to be in good agreement with the amount of lithium (i.e. charge) that would be extracted accounting for solely the transition metal redox activity.

During the first discharge, neither material shows the presence of a reversible plateau, indicating a difference in the thermodynamic pathways followed during the extraction (charge) and insertion (discharge) of lithium ions from/in the lattice of each sample.

For the materials of Example 1b the first cycle presents the lowest coulombic efficiency value due to the presence of the high potential plateau which is not reversible. The coulombic efficiencies appear to quickly improve from the first cycle values, around 60-80%, to values higher than 98% within the first five cycles.

The materials according to Example 1c were characterised electrochemically through galvanostatic cycling performed with a BioLogic VMP3 and a Maccor 4600 series potentiostats. All the samples were assembled into stainless steel coincells against metallic lithium and cycled between 2 and 4.8 V vs. $Li^+/Li$ for 100 cycles at a current rate of 50 mAg-1. The electrolyte employed was LP30 (a 1M solution of $LiPF_6$ in 1;1 w/w ratio of EC;DMC).

FIGS. 6A-6B show the potential curves during the charge and subsequent discharge of the first cycle for each material according to Example 1c. Both samples present a high voltage plateau of different lengths centered on 4.5 V vs. $Li^+/Li^0$, and a sloped region at the beginning of the charge. The length of this region may be attributed to the oxidation of nickel from $Ni^{+2}$ toward $Ni^{+4}$ and $Co^{+3}$ toward $Co^{+4}$ and appears to be in good agreement with the amount of lithium (i.e. charge) that would be extracted accounting for solely the transition metal redox activity.

During the first discharge, neither material shows the presence of a reversible plateau, indicating a difference in the thermodynamic pathways followed during the extraction (charge) and insertion (discharge) of lithium ions from/in the lattice of each sample.

For both materials according to Example 1c the first cycle presents the lowest coulombic efficiency value due to the presence of the high potential plateau which is not reversible. The coulombic efficiencies appear to quickly improve from the first cycle values, around 60-80%, to values higher than 98% within the first five cycles.

Example 4—Gas Evolution During the First Cycle of the Nickel Substituted Lithium Rich Materials One pellet of material according to Example 1a was assembled into a Swagelok® test cell specifically machined to carry out an Operando Electrochemical Mass Spectrometry (OEMS) measurement. The mass spectrometry measurement involved in the OEMS experiment was performed with a Thermo-Fisher quadrupolar mass spectrometer. OEMS was performed on the set of materials in order to get an insight on the origin of the extra-capacity that is observed during the first cycle.

Figure 7A:
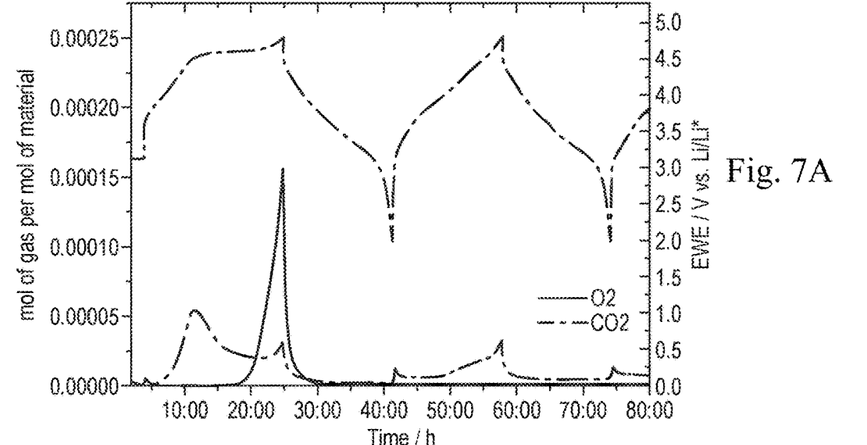
FIGS. 7A-7C shows OEMS analysis of the nickel doped $Li_2MnO_2$ materials.
Figure 7B:
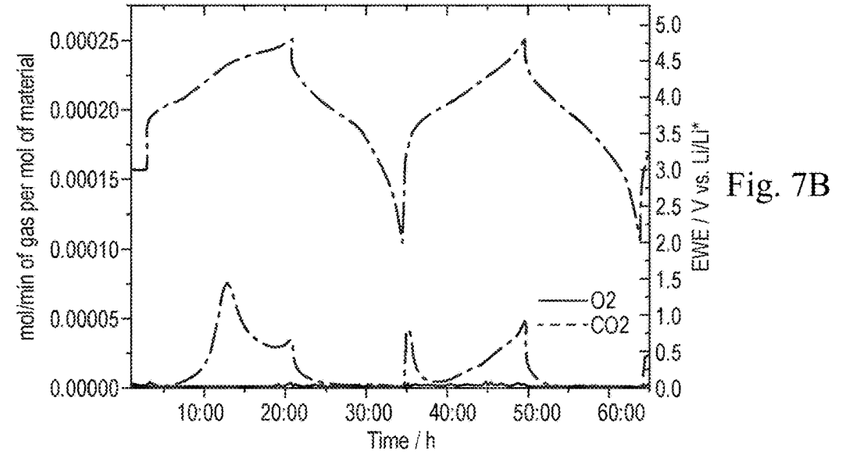
Figure 7C:
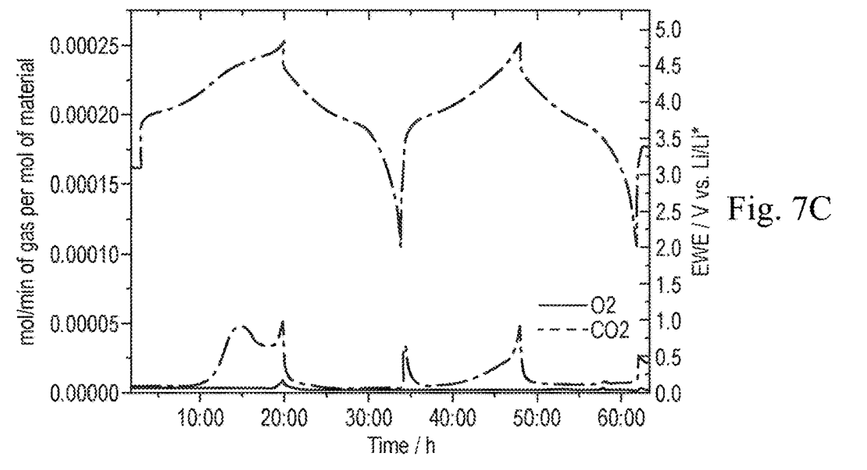

FIGS. 7A-7C show OEMS analysis of the nickel doped for x=0.2, 0.3 and 0.4, respectively. Each graph shows the galvanostatic curve during the first two cycles (top lines in each graph), the oxygen trace, and the carbon dioxide trace for each material. The right y-axis represents the electrode potential while the left y-axis the gas release rate expressed as moles of gas per minute per mole of active material, both axis reported as function of lithium equivalents. Argon was used as carrier gas with a flux rate of 0.7 mL/min and the electrode was cycled against metallic lithium at a rate of 15 mAg$^{-1}$ between 2 and 4.8 V vs. Li$^+$/Li$^0$ for all the materials. The electrolyte employed was a 1M solution of LiPF$_6$ in propylene carbonate.

CO$_2$ and O$_2$ were the only gaseous species detected for all the samples and a clear trend appears from FIG. 4, with a progressively lower amount of gas released as the amount of dopant nickel increases.

CO$_2$ is detected first in all cases, peaking at the beginning of the high potential plateau (around 4.5 V vs. Li$^+$/Li$^0$) region and progressively decreasing until the end of charge.

The amount of CO$_2$ decreases in line with the increase in nickel in content but is never eliminated. On the other hand, molecular oxygen appears to be released in a spike-like fashion that reaches its maximum towards the end of charge for the materials of the present invention. In the case of the high Ni substitution where x=0.4 it has been shown that there is almost complete suppression of O$_2$ and a strong reduction in the amount of detected CO$_2$ (FIG. 7C) This result is suggestive of the important role played by nickel as in stabilizing the oxide structures at high potentials by reducing the oxygen loss process.

One pellet of Composition 1 Li$_{1.333}$Co$_{0.15}$Al$_{0.5}$Ni$_{0.2}$Mn$_{0.4667}$O$_2$ (a composition from Example 1c) was assembled into a Swagelok® test cell specifically machined to carry out an Operando Electrochemical Mass Spectrometry (OEMS) measurement. The mass spectrometry measurement involved in the OEMS experiment was performed with a Thermo-Fisher quadrupolar mass spectrometer. OEMS was performed on the set of materials in order to get an insight on the origin of the extra-capacity that is observed during the first cycle.

Figure 8:
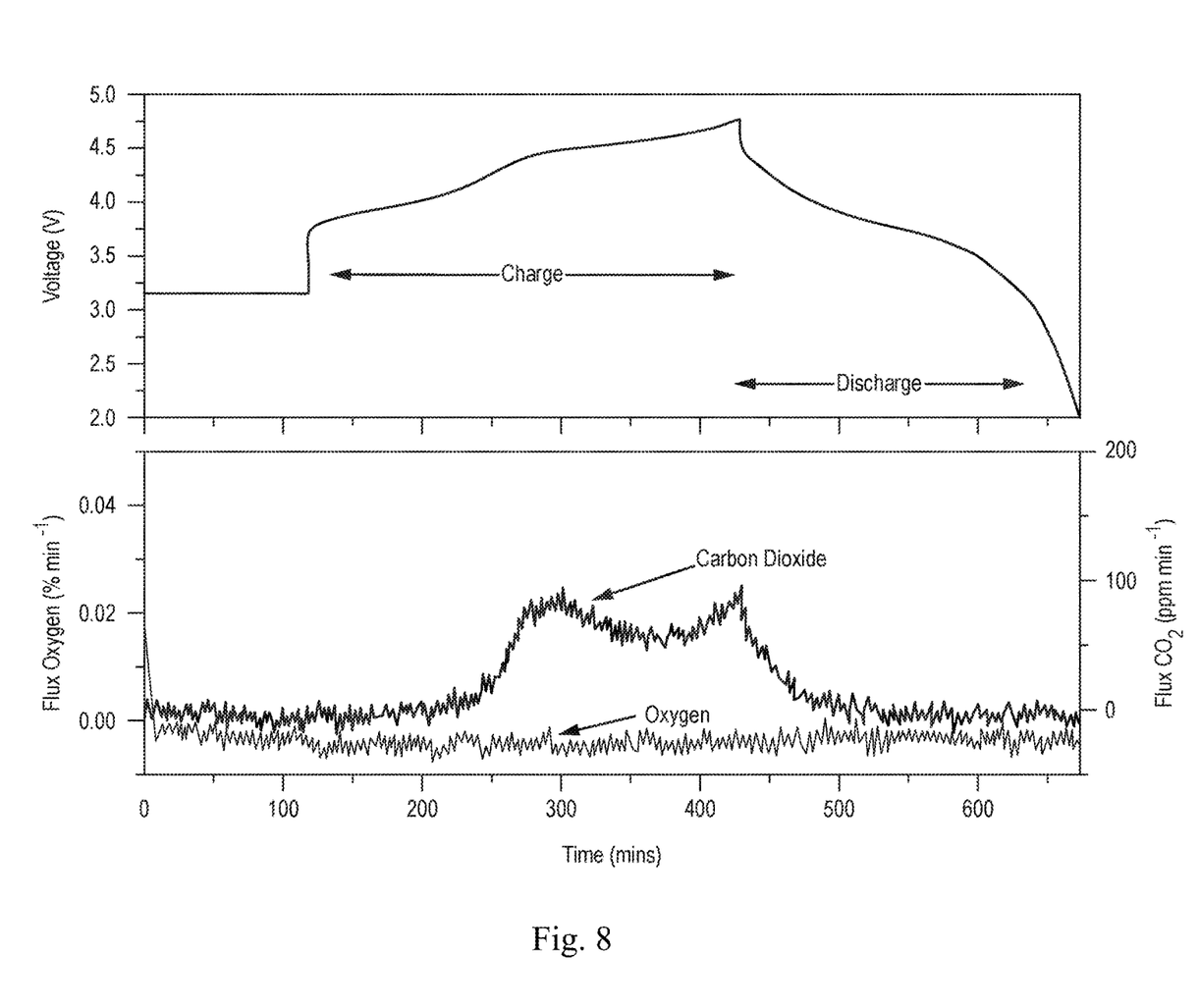
FIG. 8 shows OEMS analysis of one of the materials according to the Example 1c.

FIG. 8 shows OEMS analysis of the nickel doped Li$_{1.1333}$Co$_{0.15}$Al$_{0.05}$Ni$_{0.2}$Mn$_{0.4667}$O$_2$ respectively. The graph shows the galvanostatic curve during the first two cycles (top graph), the oxygen trace, and the carbon dioxide trace for each material(bottom graph). Argon was used as carrier gas with a flux rate of 0.7 mL/min and the electrode was cycled against metallic lithium at a rate of 15 mAg-1 between 2 and 4.8 V vs. Li$^+$/Li$^0$ for all the materials. The electrolyte employed was a 1M solution of LiPF$_6$ in propylene carbonate.

CO$_2$ was the only gaseous species detected for all the samples and a progressively lower amount of gas released as the amount of dopant nickel increases. CO$_2$ peaks at the beginning of the high potential plateau (around 4.5 V vs. Li$^+$/Li$^0$) region and progressively decreasing until the end of charge.

The invention claimed is:

1. A method comprising:
    suppressing gas evolution from a cathode material during a charge cycle by incorporating a nickel doped lithium rich cathode material of the general formula:

wherein the cathode material is selected from one of Li$_{1.15}$Co$_{0.15}$Ni$_{0.2}$Mn$_{0.5}$O$_2$Li$_{1.15}$Ni$_{0.2}$Co$_{0.1}$Al$_{0.05}$Mn$_{0.5}$O$_2$, or Li$_{1.1333}$Ni$_{0.2}$Co$_{0.15}$Al$_{0.05}$Mn$_{0.4667}$O$_2$.

2. The method of claim 1, wherein the gas is at least one of molecular oxygen and carbon dioxide.

3. A method comprising:
    suppressing gas evolution from a cathode material during a charge cycle by incorporating a nickel doped lithium rich cathode material of the general formula:

wherein x is equal to or greater than 0.06 and equal to or less than 0.12.

4. A method comprising:
    suppressing gas evolution from a cathode material during a charge cycle by incorporating a nickel doped lithium rich cathode material,
    wherein the cathode material is Li$_{1.066}$Ni$_{0.4}$Mn$_{0.533}$O$_2$.

5. The method of claim 3, wherein the gas is at least one of molecular oxygen and carbon dioxide.

6. The method of claim 4, wherein the gas is at least one of molecular oxygen and carbon dioxide.

7. A method comprising:
    increasing the charge capacity of a cathode material by incorporating a nickel doped lithium rich cathode material of the general formula:

wherein the cathode material is selected from one of Li$_{1.15}$Co$_{0.15}$Ni$_{0.2}$Mn$_{0.5}$O$_2$Li$_{1.15}$Ni$_{0.2}$Co$_{0.1}$Al$_{0.05}$Mn$_{0.5}$O$_2$, or Li$_{1.1333}$Ni$_{0.2}$Co$_{0.15}$Al$_{0.05}$Mn$_{0.4667}$O$_2$.

8. A method comprising:
increasing the charge capacity of a cathode material by incorporating a nickel doped lithium rich cathode material of the general formula:

$$Li_{\left(\frac{4}{3}-\frac{2x}{3}\right)}Ni_xMn_{\left(\frac{2}{3}-\frac{x}{3}\right)}O_2$$

wherein x is greater than 0.06 and equal to or less than 0.2.

9. A method comprising:
increasing the charge capacity of a cathode material by incorporating a nickel doped lithium rich cathode material, wherein the cathode material is $Li_{1.066}Ni_{0.4}Mn_{0.533}O_2$.

* * * * *